United States Patent
Ellis et al.

(10) Patent No.: US 7,763,197 B2
(45) Date of Patent: Jul. 27, 2010

(54) RIGID PLASTIC GLASS RUN CHANNEL

(75) Inventors: Peter J. Ellis, Rochester Hills, MI (US); Haruhisa Kawase, Rochester Hills, MI (US); Salem Nano, Sterling Heights, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 12/380,912

(22) Filed: Mar. 5, 2009

(65) Prior Publication Data

US 2009/0174108 A1 Jul. 9, 2009

Related U.S. Application Data

(62) Division of application No. 10/556,923, filed as application No. PCT/CA04/00822 on Jun. 2, 2004, now abandoned.

(60) Provisional application No. 60/475,473, filed on Jun. 4, 2003.

(51) Int. Cl.
B29C 47/04 (2006.01)
(52) U.S. Cl. .................. 264/173.17; 264/149
(58) Field of Classification Search ........... 264/149, 264/173.17
See application file for complete search history.

(56) References Cited

U.S. PATENT DOCUMENTS

| | | | | |
|---|---|---|---|---|
| 3,556,888 A | * | 1/1971 | Goldsworthy | 156/73.2 |
| 4,087,509 A | * | 5/1978 | Gates | 264/295 |
| 4,865,796 A | * | 9/1989 | Tamura et al. | 264/40.7 |
| 4,913,863 A | * | 4/1990 | Burrafato et al. | 264/40.6 |
| 5,171,499 A | * | 12/1992 | Cehelnik et al. | 264/151 |
| 5,343,609 A | | 9/1994 | McManus | |
| 5,415,822 A | | 5/1995 | Cook | |
| 6,174,477 B1 | * | 1/2001 | Nagahashi et al. | 264/167 |
| 6,716,522 B2 | * | 4/2004 | Matsumoto et al. | 428/326 |
| 6,817,651 B2 | | 11/2004 | Carvalho et al. | |
| 2002/0175443 A1 | * | 11/2002 | Visconti et al. | 264/136 |
| 2003/0017302 A1 | | 1/2003 | Drozd et al. | |

FOREIGN PATENT DOCUMENTS

| | | |
|---|---|---|
| EP | 0 490 733 A1 | 6/1992 |
| EP | 0 553 018 A1 | 1/1993 |
| EP | 0 540 183 B1 | 5/1993 |
| EP | 0553018 * | 7/1993 |
| WO | WO 03/093044 A2 | 11/2003 |

* cited by examiner

Primary Examiner—Joseph S Del Sole
Assistant Examiner—Kimberly A Stewart
(74) Attorney, Agent, or Firm—Clark Hill PLC

(57) ABSTRACT

A process for the production of a glass run channel is provided wherein the glass run channel has a S-shaped core of a polymeric material, onto which glass and/or frame sealing components are co-extruded. Preferably, a slip agent coating is applied shortly after the sealing components are added so that a completely polymeric glass run channel is produced in a single operation. The polymeric glass run channel is lighter, less expensive and more easily recycled than the prior art glass run channels.

12 Claims, 2 Drawing Sheets

RIGID PLASTIC GLASS RUN CHANNEL

CROSS-REFERENCE TO RELATED APPLICATIONS

This application is a division of U.S. application Ser. No. 10/556,923, filed on Oct. 26, 2006, which is a national stage application of PCT/CA04/00822, filed on Jun. 2, 2004, which claims the benefit of U.S. provisional application Ser. No. 60/475,473, filed on Jun. 4, 2003.

FIELD OF THE INVENTION

This invention relates generally to a rigid glass run channel for a vehicle window, and, more particularly, to a rigid glass run channel that has production advantages over prior art devices.

DISCUSSION OF THE RELATED ART

Most vehicle doors include a door window that can either be mechanically or electrically lowered into a door well of the door to provide an opening in the door, or raised from the door well to close the opening in a sealing manner. These doors commonly include a resilient glass run having a glass run channel in which the window travels and/or seats when it moved into a closed position. Different glass run designs are known in the art that allow the window to be repeatedly moved, removed or inserted within the glass run channel and still maintain an effective seal against environmental conditions such as wind and moisture.

In modern designs, the glass run includes an outer layer, such as a TPV rubber, an EPDM rubber, a thermoplastic material or some other suitable material, that is extruded onto a rigid metal insert that gives the glass run support and shape.

In general, the plastic portions of glass run channels can be formed from a number of different plastic materials but will primarily be selected from thermoplastics and thermoplastic elastomers (TPEs). Depending on their hardness TPEs are sometimes categorized as thermoplastics and sometimes as elastomers. For the purpose of this invention no such distinction will be made and hard and soft grades of plastic will all be referred to as TPEs.

TPEs are commercially available in several different brands and types. Each type can be obtained in different grades having different properties such as, hardness, tensile strength, compression, elongation, thermal stability and colorability. Selection of the appropriate TPE for a particular application in the practise of the present invention depends on a suitable combination of such properties.

Types of TPEs which are particularly useful are thermoplastic polyolefins (TPO's) (or rubber-polyolefin blends), styrenic block copolymers, elastomeric alloys, thermoplastic alloys, thermoplastic elastomeric alloys, thermoplastic ionomers, thermoplastic polyurethanes, polyvinyl chlorides and blends thereof.

The thermoplastic polyolefins (TPOs) are blends of various polyolefins with ethylene-propylene rubber (EPR) or ethylene-propylene-diene-monomer (EPDM). Suitable polyolefins include polypropylene and various types of polyethylene. Copolymers of propylene and ethylene and blends of TPOs can also be used. TPOs are also useful as modifiers of other TPEs.

Styrenic block copolymers are commercially available in many types (and grades within types), for example, Kraton® from Shell Chemical Co. is based on block copolymers of styrene with a diene or an olefin pair, ethylene-butylene. The diene can be isoprene or butadiene.

Alloying is an interactive combination of two or more materials to give a material having better properties than those of the corresponding blend. Thermoplastic alloys are available with properties enabling them to be painted. Thermoplastic elastomeric alloys and elastomeric alloys (EAs) are composed of synergistic mixtures of two or more polymers that have been treated to give them properties different from simple blends of the major constituents. The two types of elastomeric alloys are melt processable rubbers (MPRs) and thermoplastic vulcanizates (TPVs).

EA-MPRs are a category of TPEs made of a highly plasticized, single phase combination of a chlorinated polyolefin, an ethylene-vinyl acetate copolymer and an acrylic ester mixture in which the rubber phase is highly crosslinked, for example, Alcryn™ from E.I. du Pont Nemours, Inc. EA-TPVs are made of a rubber/plastic polymer mixture in which the rubber phase is fully crosslinked.

The plastic phase of a TPV is commonly a polyolefin (especially polypropylene), and the rubber phase is often an ethylene-propylene elastomer. A particularly useful TPV, suitable for windows seals, is formed from polypropylene and EPDM rubber and is commercially available in several grades as Santoprene™ from Advanced Elastomer Systems.

Thermoplastic polyurethanes (TPUs) are formed by copolymerization of diisocyanates with long-chain diols and short-chain diols. TPUs are available commercially in a number of types and grades, for example, Texin™ from Mobay Corporation, Estane™ from B.F. Goodrich Co., Pellethane™ from Dow Chemical Corp. and Q-Thane™ from K. J. Quinn and Co., Inc.

Polyvinyl chloride (PVC) based TPEs are also suitable for window seals and are available in different grades and blends with other TPEs and rubbers. P-Valloy is one such material available from GBIE (Gerry Bareich Import Export Inc.) of Canada.

Thermoplastic ionomers are polymers containing interchain ionic bonding which affords tough, durable, transparent thermoplastics, for example, Surlyn™ from E.I. du Pont de Nemours, Inc.

The insert of current glass run is a piece of stamped steel or aluminium, a flexible wire, lanced or perforated metal core or film, or even a suitable polymeric material. The insert enables the glass run to be rigidly secured to a flange extending from stamped door panels along the periphery of the door opening. Examples of this type of glass run channel design is described in U.S. Pat. Nos. 4,830,898 (Smith), 5,398,451 (Mesnel) or 5,651,217 (Mesnel)

The above described glass run designs have been generally successful in meeting the demands required by the industry. However, certain disadvantages of these types of glass runs leaves room for improvement. For example, because most known glass runs are rigid members and are not readily flexible, they must be stretched or bent to the shape of the door opening before being secured to the door flange. However, inconsistencies in the alignment and position of the flange, as well as the thickness of the flange, require that the glass run be further twisted and bent as it is being secured to the door flange. Because the glass run is rigid, such a process has obvious drawbacks when trying to secure the glass run to the door flange. Also, the resulting twisting nature of the glass run may alter the sealing properties of the glass run channel in the glass run.

In recent years, a common glass run channel design has a metallic core with a generally S-shaped cross section which is covered by suitable elastomeric material. These designs are shown in, for example, the above named Mesnel patents. The S-shape serves two functions by providing one channel facing in a first direction for clamping attachment to a door flange for retention of the channel thereon and another channel facing in a second direction for guiding, supporting or receiving the edge of a glass window pane. Although an S-shaped metallic core well serves the aforementioned two functions, it still suffers from the problems described hereinabove with respect to glass run channels having metallic support structures.

A further problem with these types of structures is the requirement for a multi-part production process wherein the support is prepared in one operation, coated with a elastomeric material in a second operation, treated with additional materials, such as slip agents and the like, in a third operation, and then bend or stretched to a suitable shape in a fourth operation.

The present invention offers an improvement in this regard.

U.S. Pat. Nos. 5,343,609 (McManus), 6,023,888 (Dover) and 6,485,663 (Dover) describe glass run channels in which a base, S-shaped structure is produced from a polymeric material, with an optional metal support core. The S-shaped structure is co-extruded with other, softer polymeric materials to provide a series of projections which are used to seal the glass run channel against the vehicle's metal frame. By providing a polymeric support structure, the glass run channel can be easily bend and/or moulded to a suitable shape for use in the vehicle while avoiding the stretching and bending operations required for the metal support structures.

In all of these plastic support embodiments, however, a U-shaped structure is included in which a "resilient window engaging insert member" is inserted and held in position mechanically by tabs located on the inside of the U-shaped structure. The insert member can additionally comprise a slip agent or flocking in order to aid in providing suitable sealing properties with the glass pane of the window. However, this process requires the production of a co-extruded support structure, the production of an insert member, flocking of the insert member, and insertion of the insert member into the support structure. As such, this process still requires a multi-step method for production of a glass run channel.

As such, there is still a desire to provide a single unit, flexible glass run channel that can be readily shaped to be secured to the door flange, and which includes a support member for supporting the glass run channel and a sealing portion for sealing against the glass pane of the window. It would also be desirable to provide such a glass run channel that could be produced in a single operation. It is therefore an object of the present invention to provide such a glass run channel structure.

SUMMARY OF THE INVENTION

Accordingly, it is a principal advantage of the present to provide a single unit, flexible glass run channel that can be readily shaped to be secured to the door flange, and which includes a support member for supporting the glass run channel and a sealing portion for sealing against the glass pane of the window.

It is a further advantage of the present invention to provide a process for the production of such a glass run channel.

It is a still further advantage of the present invention to provide a single stage process for the production of such a glass run channel.

The advantages set out hereinabove, as well as other objects and goals inherent thereto, are at least partially or fully provided by the process of the present invention, as set out herein below.

Accordingly, in one aspect, the present invention provides a glass run channel comprising a polymeric support structure, and preferably an S-shaped polymeric support structure, a polymeric frame sealing portion, and a polymeric glass sealing portion, which glass run channel is capable of being produced in a single stage operation.

Further, the glass run channel also comprises a slip agent which can also be applied to the glass run channel as part of the single stage operation.

In a further aspect, the present invention also provides a process for the production of a glass run channel comprising extruding a polymeric support structure, and preferably an S-shaped polymeric support structure, and immediately thereafter, over-extruding a polymeric frame sealing portion and a polymeric glass sealing portion. Further, a slip agent is applied to the glass run channel, immediately after production thereof, in an additional process step.

In a still further aspect, the present invention also provides the use of a glass run channel of the type described hereinabove with respect to the present invention.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

The glass run channel 10 of the present invention primarily consists of three separate portions, namely, the support structure 12, the frame sealing portion 14 and the glass sealing portion 16. Depending on the desired properties of the end product, a wide variety of polymeric materials might be utilized. However, those skilled in the art will be able to select suitable materials to achieve the desired final properties.

Figure 1:
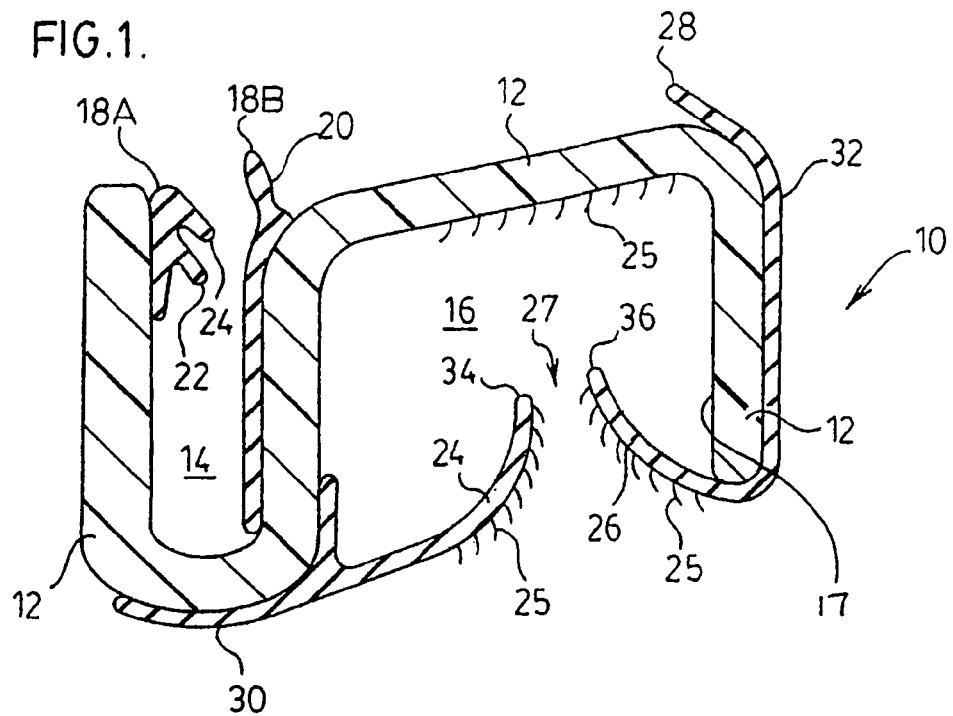
FIG. 1 is a cross-sectional view of one embodiment of a glass run channel according to the present invention.

Referring to FIG. 1 a cross-sectional view of a glass run channel 10 is shown consisting of an S-shaped core 12 produced from TPO, which is fabricated by extrusion of the TPO through an S-shaped die in an extruder. At one side of core 12 is U-shaped portion 14 which is adapted to be fitted over the frame or flange of the vehicle (not shown). On the other side of core 12 is a second U-shaped glass sealing portion 16 that is adapted to receive the edge of a panel of glass.

Attached to S-shaped core 12 are a series of softer, more flexible components made from TPV, which TPV components have also been extruded from an extruder and which fuse to S-shaped core 12. The extrusion temperature, for extrusion of the S-shaped core, and the TPV components, is generally between about 150 degrees to 250 degrees C., and preferably is about 200 degrees C.

U-shaped frame sealing portion 14 has two TPV components 18A and 18B which operate to seal glass run channel 10 to the vehicle frame. Component 18A has two protrusions 22 and 24 which act to press against the vehicle frame, and thus, seal channel 10 to the vehicle frame, as well as assist in holding channel 10 on the frame. The frame rests against component 18B, and a lip 20 further acts to seal channel 10 to the vehicle frame.

U-shaped glass sealing portion 16 is adapted to receive a pane of window glass, and opening 16 is at least partially covered by TPV components 24 and 26, each of which attached to core 12, and extends out into the mouth of glass sealing opening 16. A slot 27 between components 24 and 26 is provided for the window to enter glass sealing opening 16. When the window pane is in glass sealing opening 16, the end lips 34 and 36 of components 24 and 26, respectively, rest against the glass pane and effectively provide a seal around the glass pane.

Components 24 and 26 extend to cover portions of core 12, as indicated by component extensions 30 and 32. Extensions 30 and 32 act to cover core 12 from sight and/or from outside elements, and typically provide an improved exterior finish. Seal 28 positioned at the end of extension 32 extends beyond core 12, and also acts to seal channel 10 to the vehicle frame.

The polymeric support structure 12 of the glass run channel 10 is preferably selected so as to provide the necessary support structure for the glass run channel without the need for additional support materials such as metal or wire frames, or the like. The polymeric support structure 12 is thus preferably formed from a rigid thermoplastic or TPE. A relatively rigid material, for example a polypropylene, preferably has a hardness in the range of 30 to 85 durometers, preferably about 70 durometers, according to the Shore D scale. Most preferably, however, the polymeric support structure 12 is a rigid TPO material.

The softer frame sealing portions 14, and the glass sealing portions 16 of the glass run channel are preferably formed from a softer, semi-rigid, more resilient TPE, or a rubber type material such as, for example, natural rubber, styrene-butadiene rubber (SBR), ethylene-propylene rubber (EPR) or ethylene-propylene-diene-monomer (EPDM) rubber. A TPV material, such as Santoprene, preferably having a hardness in the range of 40 to 90 durometers, and preferably about 70 durometers according to the Shore A scale, is one preferred material for a sealing portion.

Also, while the frame sealing portion 14 and the glass sealing portion 16 can be different materials, in a preferred embodiment, the frame and glass sealing portions are the same material.

As such, in a most preferred embodiment, the frame sealing portions 14 and glass sealing portions 16 are both TPV materials, and these are applied to a TPO material used as the support structure. It is also a feature of the present invention that the TPV material be applied to the TPO material immediately after the TPO material has been produced. As such, it is co-extruded onto the TPO surface before the TPO has cooled to any great extent.

In particular, the polymeric frame sealing portion 14 and/or the polymeric glass sealing portion 16 are over-extruded over the polymeric support structure 12 within 30 seconds of the formation of the polymeric support structure 12. More preferably, at least one component is over-extruded over the polymeric support structure 12 within 16 seconds of the formation of the polymeric support structure 12.

It should be noted that the materials described herein are commonly readily processed and fabricated, for example, by extrusion or molding and are particularly amenable to coextrusion and simultaneous molding in order to produce a glass run channel 10 extrudate comprising a support structure, a frame sealing portion and a glass sealing portion. The production of the glass run channel of the present invention can thus be done in a single operation without the need for subsequent insertion of sealing inserts or the like to provide a glass sealing section.

Other materials may be incorporated for blending or co-extrusion which include, for example, melt-blended olefin-based elastomers including polypropylene, polyethylene. Other components can include plasticizers, viscosity modifiers such as processing oils or esters, fillers, colourants, curing agents, antioxidants and other ingredients. Suitable fillers can include calcium silicate, clay, kaolin, talc, silica, diatomaceous earth; powdered mica, barium sulfate, aluminum sulfate, calcium sulfate, basic magnesium carbonate, glass fibers, and carbon fibers, provided the filler is used in an amount small enough not to adversely affect either the hardness or the coefficients of friction of the thermoplastic copolymer.

The components of the glass run channel 10 are preferably selected so as to provide acceptable properties with respect to, for example, flexibility, durability, hardness, UV resistance, and the like. As such, through the use of appropriate materials, a glass run channel 10 can be produced which provide good properties necessary for automotive applications. These properties can further include, for example, suitable softness, abrasion resistance and low coefficients of friction. Further, by varying the ratios of the components, one may adjust or provide, inter alia, suitable hardness/softness, oil and temperature resistance, paintability, oxidation resistance, and extrudability properties.

As a final step, described hereinbelow, a slip agent 25, is provided on those surfaces of the TPV components and S-shaped core 12, which are in contact with the glass pane of the vehicle window.

The addition of a slip agent 25 is a preferred modification of the glass sealing portion 16, or more generally, the glass-contacting areas of the glass run channel of the present invention. The slip agent 25 is added to the glass-contacting areas of the glass sealing portion 16 and/or the polymeric support structure 12, and is used to provide suitable properties to the polymer component in order to ensure that the glass window pane will move smoothly within the glass run channel while maintaining an effective seal. The slip agent 25 is preferably added to the glass sealing portion by flocking in a manner known to those skilled in the art, using a polyamide or polyester flocking material. The flocking stage can be including as part of the single stage production operation. The slip agent 25 might also be a silicone/urethane based spray applied to the glass sealing portion.

The slip agent 25 is preferably added as an additional process step which occurs immediately after production of the basic glass run channel. As such, the slip agent 25 is preferably added within 30 seconds, and more preferably, within 10 seconds, of the production of the basic glass run channel.

Figure 2:
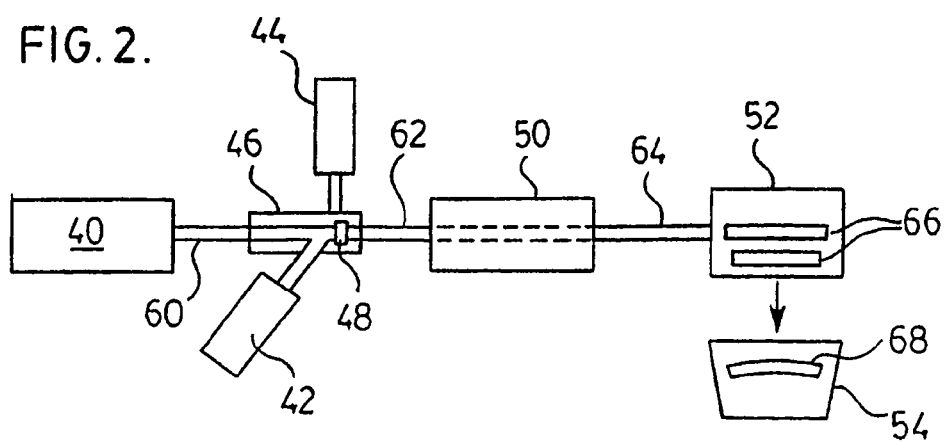
FIG. 2 is a schematic representation of the production process for producing the glass run channel of FIG. 1.

In FIG. 2, a process schematic for the production of the glass run channel of FIG. 1 is shown. A TPO polymer is extruded in extruder 40 to produce a continuous ribbon 60 of S-shaped core 12, as shown in FIG. 1. Ribbon 60 is allowed to air cool to a temperature where its structure is stable, but is otherwise immediately fed to a second extrusion section 46 wherein a TPV material, which has been heated in second extruder 42, is applied, through die section 48, to form the various TPV components shown in FIG. 1, namely components 18A, 18B, 24 and 26. Because of the heat from the TPV extrusion and the residual heat of the TPO extrusion, the TPV bonds to the surface of the TPO.

A slip agent 25, being a flocked acrylic component is applied to the surfaces of core 12, as shown in FIG. 1, using third extruder 44. Again, due to the heat of the slip agent 25, and the residual heat of the TPO/TPV coextrusion, the slip agent 25 bonds to the TPV and TPO components. A ribbon of end product extrudate 62 exits extrusion section 46, and passes to a cooling bath 50 where it is cooled to set its final structure. The cooled ribbon of extrudate 64 is then passed to a cutting station 52 where it is cut to a desired length to produce glass run channel templates 66. These templates 66 are subsequently fed to a bending station 54, wherein they are re-heated and bend to a shaped final glass run channel 68.

Production operation is preferably conducted in a single stage wherein the entire glass run channel is produced at one time. This is preferably accomplished by co-extrusion of all components and application of a slip agent, by flocking before cooling the extruded components. As a result of this production process, and composition, a completely polymeric glass run channel 12 is produced in a single operation. The resulting polymeric glass run channel 12 is lighter, less expensive and more easily recycled than the prior art glass run channels, since, inter alia, the metal core is eliminated, and the glass run channel is produced in a single operation wherein one production stage immediately follows an earlier production stage.

Figure 3:
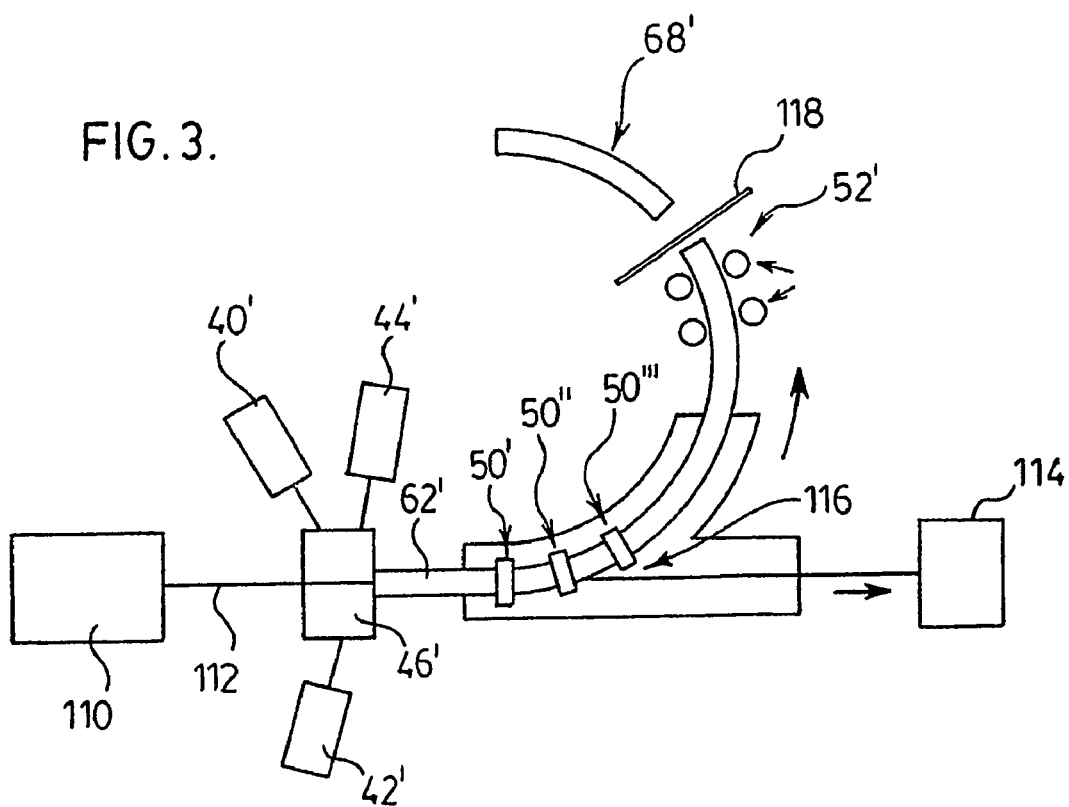
FIG. 3 is a schematic representation of an alternate production process for producing the glass run channel of FIG. 1.

Referring to FIG. 3, a second process schematic for the production of the glass run channel of FIG. 1 is shown. The process is similar to the process illustrated in FIG. 2, except that the bending operation is undertaken in a continuous process.

Figure 4:
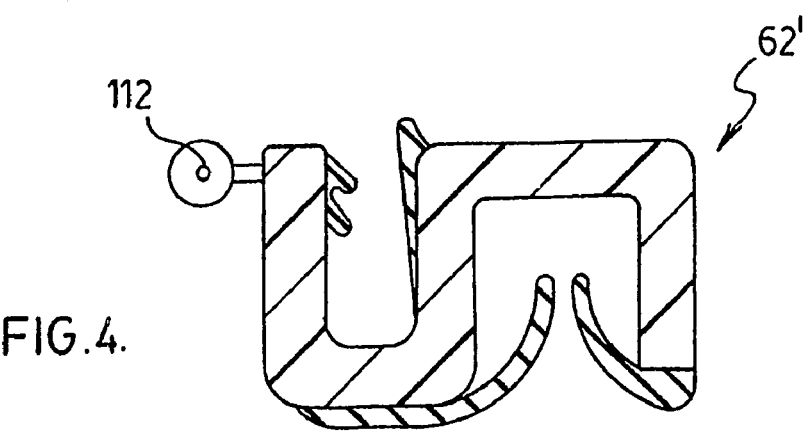
FIG. 4 is a cross-sectional view of a the glass run channel of FIG. 1 in an intermediate process stage.

The three extruders 40', 42', and 44' are operably connected to a die head 46' wherein a ribbon of end product extrudate 62' is co-extruded in the process described above. A wire pay out machine 110 is positioned upstream of the die head 46'. Machine 110 pays out a wire 112 that extends through the die head 46' to be coextruded to the ribbon of end product extrudate 62' to produce a cross section as illustrated in FIG. 4.

In-line with the pay out machine 110 and the die head 46' is a wire puller 114. Wire puller 114 receives the wire 112 and maintains the wire 112 with a predetermined amount of tension.

The production next includes a series of cooling dies 50', 50'', 50'''. Cooling die 50' is inline with the wire 112, while 50'' and 50''' deviate arcuately from the inline direction. Cooling die 50'' includes a shearing plate 116. Shearing plate is position to cut the coextruded wire 112 from the ribbon of end product extrudate 62'. The cooling dies 50', 50'' and 50''' are also arranged arcuately to form the end product extrudate 62' into the desired finished bend or shape.

The wire puller 114 pulls the wire so that the end product extrudate 62' is pulled through at least cooling die 50' and preferably through cooling die 50''. Once the end product extrudate 62' has passed through cooling die 50'', shearing plate 116 cuts and separates wire 112 from the remainder of the end product extrudate 62'.

The production next includes a cutting station 52'. The cutting station 52' has a series of guide wheel mounted to minimize lateral movement while the cutter 118 cuts the ribbon of shaped end product extrudate 62' to a desired length and produce a shaped final glass run channel 68'.

Thus, it is apparent that there has been provided, in accordance with the present invention, a glass run channel, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

What is claimed is:

1. A process for the production of a polymeric glass run channel comprising the steps of:
   extruding a polymeric support structure;
   over-extruding a polymeric frame sealing portion and a polymeric glass sealing portion to the polymeric support structure to form the glass run channel immediately after the step of extruding a polymeric support structure;
   coextruding a wire with the polymeric glass run channel and pulling the wire to pull the glass run channel through at least one cooling die; and
   separating the wire from the polymeric glass run channel.

2. A process as claimed in claim 1 wherein said polymeric frame sealing portion or said polymeric glass sealing portion are over-extruded over said polymeric support structure within 30 seconds of the formation of said polymeric support structure.

3. A process as claimed in claim 2 additionally comprising the step of applying a slip agent to the glass run channel immediately after production thereof.

4. A process as claimed in claim 3 wherein said slip agent is applied to said glass run channel within 30 seconds of the formation of said glass run channel.

5. A process as claimed in claim 1 wherein said process further comprises a step of cutting said polymeric glass run channel to a desired length.

6. A process as claimed in claim 5 wherein said process further comprises a step of shaping said polymeric glass run channel.

7. A process as claimed in claim 6 wherein said process is continuous.

8. A process for forming a glass run channel from an end product extrudate utilizing a wire and a first cooling die, the process comprising the steps of:
   co-extruding the wire with the end product extrudate;
   moving the co-extruded end product extrudate and the wire through the first cooling die;
   separating the wire from the co-extruded end product extrudate; and
   cutting the end product extrudate to a desired length to produce the glass run channel.

9. A process as set forth in claim 8 including the step of passing the co-extruded end product extrudate and the wire through a second cooling die.

10. A process as set forth in claim 9 including the step of arranging the first and second cooling dies in an arcuate path to form the end product extrudate into a desired bend or shape.

11. A process as set forth in claim 10 including the step of positioning the first cooling die inline with the wire.

12. A process as set forth in claim 8 including the step of applying a predetermined amount of tension to the wire.

* * * * *